United States Patent
Leibinsohn

[15] 3,678,960
[45] July 25, 1972

[54] STOP COCK

[72] Inventor: Saul Leibinsohn, 11 Hagardom St., Rishon Lezion, Israel

[22] Filed: June 8, 1970

[21] Appl. No.: 48,807

Related U.S. Application Data

[63] Continuation of Ser. No. 714,644, March 20, 1968, abandoned.

[52] U.S. Cl. .................................. 137/625.47, 251/309
[51] Int. Cl. .................................. F16k 11/08, F16k 5/02
[58] Field of Search .................... 137/625.47; 251/309

[56] References Cited

UNITED STATES PATENTS

| 436,299 | 9/1890 | Boluss | 137/625.47 X |
| 702,406 | 6/1902 | Cody | 137/625.47 X |
| 3,048,192 | 8/1962 | Murphy, Jr. | 137/625.47 X |
| 3,185,179 | 5/1965 | Harautuneian | 137/625.47 |

FOREIGN PATENTS OR APPLICATIONS

| 205,446 | 9/1959 | Austria | 137/625.47 |

Primary Examiner—Arnold Rosenthal
Attorney—Ostrolenk, Faber, Gerb & Soffen

[57] ABSTRACT

A stop cock type of device for selectively interconnecting a plurality of fluid-carrying ducts in a variety of configurations. The device includes a plurality of outstanding ports which selectively communicate with a rotatable central hub provided with a predetermined configuration of annular passageways which make possible the selection of any one of the variety of flow configurations depending upon the angular position of the valve with respect to the ports.

1 Claim, 8 Drawing Figures

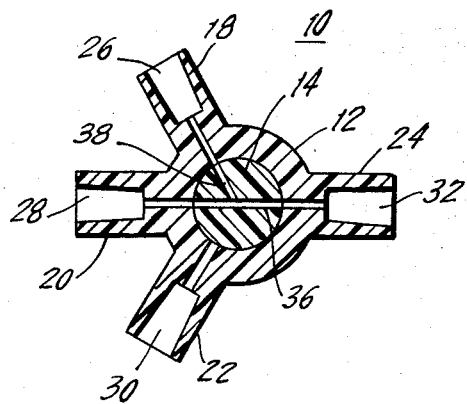
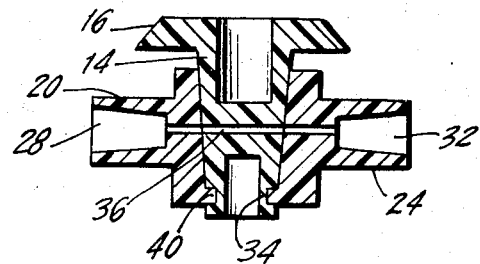
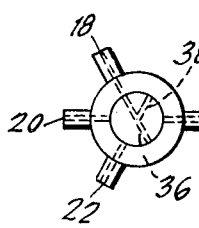
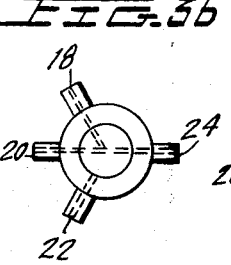
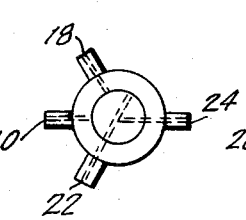
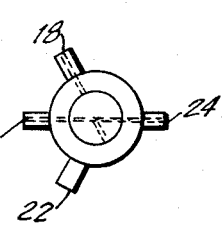
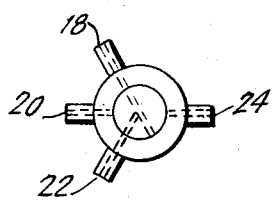
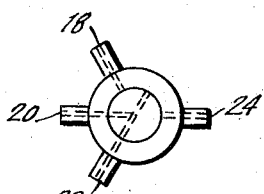
INVENTOR.
SAUL LEIBINSOHN
BY
OSTROLENK, FABER, GERB & SOFFEN
ATTORNEYS

STOP COCK

This application is a continuation of Ser. No. 714,644 filed Mar. 20, 1968, and now abandoned.

BACKGROUND OF THE INVENTION

1. Field of the Invention

In the art of fluid handling generally, it is oftentimes necessary that two or more fluids be mixed prior to being passed on within the system. However, at some subsequent time, it may be required that some number less than all the possible fluids be mixed before final distribution in which case some means must be provided to selectively prevent the flow of those fluids which are not desired. For example, in the medical field, to which the instant invention is peculiarly applicable, it is oftentimes desirable to carry out a number of steps on the same patient without unduly disturbing the patient. Thus it may be required that a single drug be administered by infusion at one moment and a mixture of two or more drugs shortly thereafter. Subsequently it may be desirable to conduct pressure data drug administration, blood sampling, and the like. Such operations are generally effected through hypodermic and intravenous needles interconnected by stop cocks which, in addition to providing the desired flow combinations, must additionally prevent the introduction of any air into the system.

2. Description of the Prior Art

As noted, the prior art has suggested the use of stop cocks for selectively interconnecting a plurality of fluid-carrying ducts. The prior art stop cocks generally include a housing having a plurality of outlet and inlet ports radially distributed with respect to the center of the housing at 90° intervals. Customarily, a rotatable plug is provided in the interior of the housing with such plug including angular bores or passageways therethrough, similarly interconnected at right angles to align themselves with the various outlet ports in the periphery of the housing. Such construction is illustrated in U.S. Pat. No. 2,991,804 in the name of R. H. Merkle. However, this "right angle" type of construction for stop cocks has a serious drawback in that there is a severely limited number of flow combinations which can be selected, primarily because two diametrically opposed ports are always joined when the stop cock is in any position other than the absolute closed condition.

U.S. Pat. No. 944,598, issued to S. S. Caskey, shows three input ports separated from each other by an angle less than 90° and a corresponding angular orientation is chosen for the passageways through the rotatable plug. However, even with this improved structure, and as will be explained in greater detail, it is still impossible to obtain either the number of or choice of combinations which is necessary in many applications such as the medical field.

SUMMARY OF THE INVENTION

The present invention seeks to overcome the above noted drawbacks and to provide an inexpensive distributing stop cock that permits a larger number of inlet and outlet combinations than is possible in the prior art. This object is achieved by positioning four ports in the casing of the stop cock in such a manner that three of the ports form angles of 60° with respect to one another while the fourth port is positioned diametrically opposed from the central one of the first mentioned three ports. A rotatable plug is provided within the casing of the stop cock and such plug is provided with a network of passageways which include one passageway diametrically through the plug while a second passageway leads from the center of the diametric passageway radially toward the periphery of the plug at an angle of 60° from the diametric passageway.

DESCRIPTION OF THE DRAWINGS

FIG. 1 is a plan view of a stop cock constructed in accordance with the instant invention;

FIG. 2 is a cross-sectional view of the stop cock of the instant invention; and

FIGS. 3a–3f illustrate the multitude of combinations that are possible with the instant invention.

DESCRIPTION OF THE PREFERRED EMBODIMENT

As shown in the figures, the stop cock 10 of the instant invention includes a central casing 12 within a central cavity of which is rotatably positioned a central hub or plug 14 which preferably terminates in a convenient hand-grasping knob 16.

The casing 12 is provided with a plurality of ports 18, 20, 22 and 24 which radially extend therefrom and, in the preferred embodiment, are integrally secured thereto. Each of the ports includes internal passageways such as 26, 28, 30 and 32, respectively, which communicate with passageways in the casing 12 such that fluid flowing into the various ports will flow toward the interior cavity of the casing to be directed by the rotatable plug 14, in a manner to be further described.

As noted previously, the plug 14 is rotatably positioned within the interior of the casing 12. Preferably, as shown in FIG. 2, the rotatable cooperation is effectuated by reduced neck portion 34 of the plug being retained by a peripheral ledge 40 provided on the casing 12. The plug includes an elongated annular passageway 36 extending diametrically therethrough and further includes a radially oriented passageway 38 which communicates at its inner end with the diametric passageway 36.

In its preferred embodiment, both the casing 12 and the rotatable plug 14 are constructed of suitable plastic material appropriately dimensioned such that during assembly, the user can simply manually press the plug into the cavity of the casing until the reduced neck portion 34 is sandwiched by the cooperating inturned peripheral ledge 40 provided on the casing. In this manner a substantially inseparble hermetic seal is achieved between the plug and the casing while at the same time the plug is easily rotatable within the casing.

As suggested earlier, an important contribution of the instant invention over the art is the fact that with the stop cock of the instant invention a greater number and variety of combinations of inlet and outlet ports may be established than was previously possible. As best shown in FIG. 1, this object is carried out by providing that three of the four ports such as 18, 20 and 22 are radially positioned 60° apart from one another while the fourth port 24 is positioned diametrically opposite the central port 20 such that there are subtended arcs of 120° between the port 24 and the ports 18 and 22, respectively. Similarly the network of passageways within the rotatable hub 14 is oriented such that the radial passageway 38 forms a 60° angle with the diametric passageway 36.

Turning to FIGS. 3a–3f there is illustrated the manner in which the novel 60° relationship established in FIG. 1 permits an increased number of combinations of inlet-outlet distribution flow paths. Beginning with FIG. 3a, with the central plug 14 in the position indicated, there is no interconnection between any two ports. Accordingly, FIG. 3a represents the stop cock of the instant invention in the completely closed condition.

FIG. 3b, on the other hand, represents a condition by which the maximum number of ports may be interconnected, namely the ports 18, 20 and 24.

FIGS. 3c, 3d, 3e and 3f illustrate intermediate possibilities. Thus in FIG. 3c port 22 communicates with port 24; in FIG. 3d port 20 communicates with port 24; in FIG. 3e port 18 communicates with port 22; and in FIG. 3f port 20 communicates with port 22.

The advantages derived from this increased number of permutations made possible by the instant invention can be appreciated from a consideration of the following example wherein the stop cock of the instant invention was applied in the medical field. Thus the port 20 was connected to an apparatus administering infusions; port 18 was connected to an apparatus for administering selected drugs and taking blood samples; port 24 was connected to a pressure recording device; and port 22 was connected to a hypodermic needle inserted in the patient.

Using this arrangement, the following functions could be quickly and easily carried out without disturbing any of the connections made. In the position of FIG. 3c, the blood pressure of the patient could be recorded. In the condition of FIG. 3d, the infusion pressure could be adjusted before administering the infusion to the patient. In FIG. 3e, drugs could be administered to the patient and blood samples taken from him. Finally, in FIG. 3f, the infusion could be administered to the patient. It should be noted that even with all of the above functions capable of being performed, stop cock condition illustrated in FIG. 3b was not even required.

Thus it will be understood that the great variety of interconnections afforded by the device of the instant invention is made possible by the unique and corresponding positions of inlet-outlet ports and plug openings, and more particularly by the fact that plug openings are positioned at an angle of 60° with respect to each other and that the angular relationships of the inlet-outlet ports match this arrangement.

Although a preferred embodiment of the instant invention has been described, it will be apparent that many modifications to the design will readily occur to a person skilled in the art without deviating from the scope of the invention, which is to be limited only by the appended claims.

The embodiments of the invention in which an exclusive privilege or property is claimed are defined as follows:

1. A stop cock device for use in the medical field for performing a number of fluid handling steps on a patient without unduly disturbing him, said device comprising:

a casing having an interior cavity, first, second and third inlet ports extending laterally from said interior cavity and communicating therewith, said first inlet port being adapted for connection to an apparatus for administering drugs and taking blood samples, said second inlet port being adapted for connection to an apparatus for administering infusions, and said third inlet port being adapted for connection into a patient undergoing medical treatment, with said first, second and third inlet ports being progressively separated, one from another, by 60°, a fourth outlet port extending radially from said interior cavity and communicating therewith adapted for connection to a pressure recording device, with said fourth outlet port being diametrically opposite said second inlet port and separated from said first and third inlet ports, respectively, by 120°;

said casing comprising substantially flat first and second end walls and a first substantially continuous wall joining said first and second end walls, each end wall having an aperture therein, aligned and concentric with the aperture in its opposed end wall, said apertures being adapted to receive a tapered plug member;

a tapered plug member rotatably mounted in said casing, positioned in said internal casing cavity, said plug having a thick body portion which gradually tapers into a relatively thin neck portion, said plug having internal passageway means aligningly cooperating with said first, second, third and fourth ports for sequentially establishing a plurality of different interconnecting conditions between said ports in response to rotation of said plug, one of said conditions being the absence of interconnection between any of said ports whereby said stop cock is in its completely closed condition, and another of said conditions being the interconnection of said fourth outlet port with said second inlet port and one of said first and third inlet ports representing a condition whereby the maximum number of ports in said four-port configuration are interconnected;

said reduced neck portion of said tapered plug member having a grooved annular seat adapted to receive a casing locking member to rotatably interlock said tapered plug in said casing, said tapered plug being rotatable within said casing through an angle of 360°;

a continuous, resilient, flexible peripheral ledge member mounted on the lip of said aperture in said second end wall adapted to sit in said grooved annular seat in said neck portion of said tapered plug to interlock said tapered plug member in said casing;

said internal passageway means in said tapered plug including a first passageway passing diametrically through said plug to interconnect said second and fourth ports in one rotatable plug position, and further including a second passageway communicating with said first passageway at the midpoint thereof and radially extending to the periphery of said tapered plug at an angle of 60° with respect to said diametric passageway in a direction to connect said second and fourth ports with said first port when in said one rotatable plug position.

* * * * *